US008817289B2

(12) United States Patent
Oishi (10) Patent No.: US 8,817,289 B2
(45) Date of Patent: Aug. 26, 2014

(54) PRINT DATA PROCESSING APPARATUS AND PRINT DATA PROCESSING METHOD

(75) Inventor: Minoru Oishi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 446 days.

(21) Appl. No.: 12/749,408

(22) Filed: Mar. 29, 2010

(65) Prior Publication Data

US 2010/0309509 A1 Dec. 9, 2010

(30) Foreign Application Priority Data

Jun. 9, 2009 (JP) .................................. 2009-137938

(51) Int. Cl.
*G06K 15/00* (2006.01)
*G06F 3/12* (2006.01)

(52) U.S. Cl.
USPC ........ 358/1.14; 358/1.13; 358/1.15; 358/1.16

(58) Field of Classification Search
USPC ....................................................... 358/1.15
See application file for complete search history.

(56) References Cited

U.S. PATENT DOCUMENTS

| 2007/0171459 A1* | 7/2007 | Dawson et al. | 358/1.15 |
| 2008/0260273 A1* | 10/2008 | Ito et al. | 382/245 |
| 2010/0027051 A1* | 2/2010 | Hamilton et al. | 358/1.15 |

FOREIGN PATENT DOCUMENTS

| JP | H05-147304 A | 6/1993 |
| JP | H10-177604 A | 6/1998 |
| JP | 2000-071572 A | 3/2000 |

OTHER PUBLICATIONS

Find&Replace Dialog http://web.archive.org/web/20080720101456/http://docs.syntext.com/users_guide/find-dialog.html (Jul. 2008).*
Print with Calc http://www.openoffice.org/documentation/manuals/oooauthors/PrintingCalc.pdf (Dec. 2004).*

* cited by examiner

Primary Examiner — Huo Long Chen
(74) Attorney, Agent, or Firm — Baker Botts L.L.P.

(57) ABSTRACT

A print data processing apparatus includes a memory which stores print data configured page by page. The print data processing apparatus further includes an unnecessary page detection portion configured to detect an unnecessary page from the print data stored in the memory. The unnecessary page includes ruled line data and does not include character data. Moreover, the print data processing apparatus further includes an unnecessary page deletion portion configured to delete, from the print data stored in the memory, the unnecessary page detected by the unnecessary page detection portion.

6 Claims, 6 Drawing Sheets

1ST PAGE     2ND PAGE

Fig. 5B

1ST PAGE     2ND PAGE

Fig. 6

1ST PAGE

PRINT DATA PROCESSING APPARATUS AND PRINT DATA PROCESSING METHOD

CROSS REFERENCE TO RELATED APPLICATION

The present application claims priority from Japanese Patent Application No. 2009-137938, filed on Jun. 9, 2009, the disclosure of which is incorporated herein by reference in its entirely.

BACKGROUND

1. Technical Field

The present invention relates to a print data processing apparatus, and a print data processing method, which process print data to be printed.

2. Related Art

A print data processing apparatus is known with which, in the event that print data overrun a print area of paper, only print data included in the print area are printed on the paper, and the print data overrunning the print area are printed on separate paper as another page. In the case of this apparatus, extra paper has been needed even if details printed on the separate paper are unnecessary.

Meanwhile, a print data processing apparatus is known which deletes a portion of the print data which overruns the print area. In the case of this apparatus, there has been a problem in that, even when necessary details have also been deleted, it is difficult for a user to become aware of it.

SUMMARY

A need has arisen to provide a print data processing apparatus and a print data processing method which may realize a printing without deleting necessary details, while reducing printing on extra paper, in a case that print data are in, for example, a table form.

According to an embodiment of the present invention, a print data processing apparatus comprises a memory which stores print data configured page by page. The print data processing apparatus further comprises an unnecessary page detection portion configured to detect an unnecessary page from the print data stored in the memory. The unnecessary page includes ruled line data and does not include character data. Moreover, the print data processing apparatus further comprises an unnecessary page deletion portion configured to delete, from the print data stored in the memory, the unnecessary page detected by the unnecessary page detection portion.

According to an embodiment of the present invention, a print data processing method for a print data processing apparatus including a memory which stores print data configured page by page, comprising an unnecessary page detection step of detecting an unnecessary page including ruled line data and not including character data from the print data stored in the memory. The print data processing method further comprises an unnecessary page deletion step of deleting, from the print data stored in the memory, the unnecessary page detected in the unnecessary page detection step.

BRIEF DESCRIPTION OF THE DRAWINGS

For a more complete understanding of the present invention, the needs satisfied thereby, and the features and advantages thereof, reference now is made to the following descriptions taken in connection with the accompanying drawings wherein.

DESCRIPTION OF THE PREFERRED EMBODIMENT(S)

Embodiments of the invention and their features and advantages may be understood by referring to FIGS. 1-6, like numerals being used for like corresponding parts in the various drawings. Hereafter, a detailed description will be given, while referring to the drawings, of an embodiment in which a print data processing apparatus and a print data processing method are embodied as a computer (hereafter referred to as a personal computer) 100 connected to a complex machine 200.

Configuration of System

Figure 1:
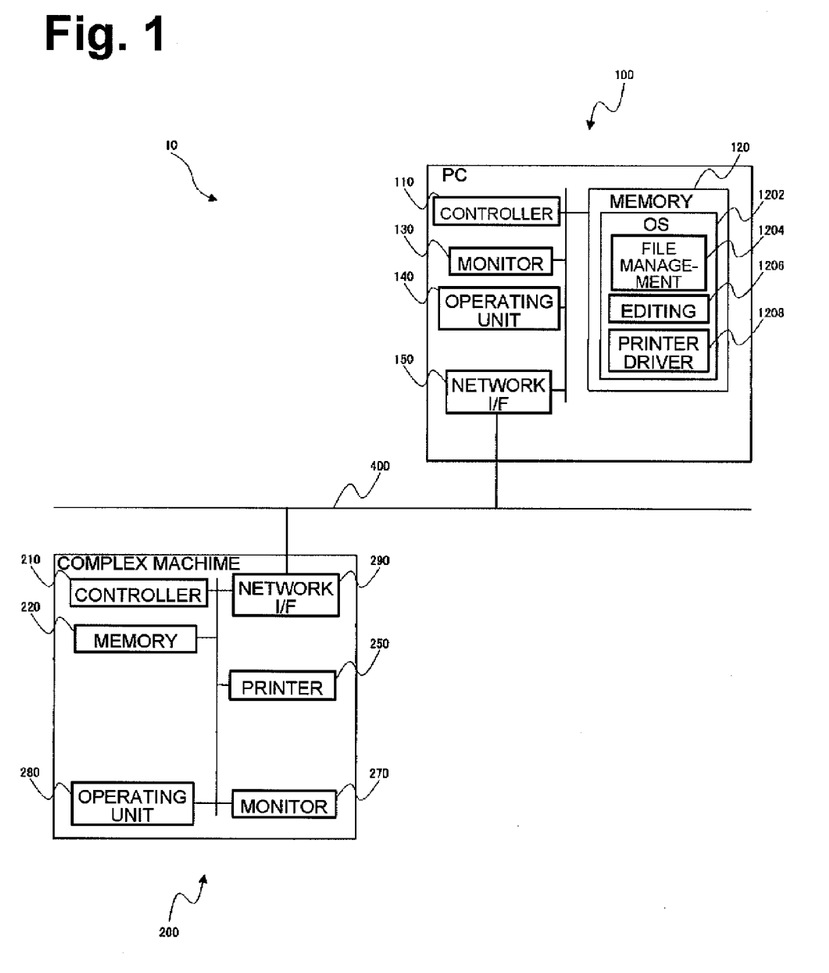
FIG. 1 is a block diagram showing a configuration of a complex machine system according to an embodiment.

A description will be given, referring to FIG. 1, of a complex machine system 10 configured of the personal computer 100 and complex machine 200. The personal computer 100 and complex machine 200 are connected by a local area network (LAN) 400 in such a way that data can be transmitted and received. A method of connecting the personal computer 100 and complex machine 200, not being limited to using the LAN 400, may also be a USB connection or a parallel connection.

Hereafter, a description will be given of a configuration of each device. Firstly, a description will be given of the personal computer 100. The personal computer 100 includes a controller 110, a memory 120, a monitor 130, an operating unit 140, and a network interface (hereafter referred to as a "network I/F") 150. The controller 110, conducting the control of its own apparatus, is configured of a CPU which executes an arithmetic processing, an ROM which stores various kinds of program, and an RAM acting as a working area.

The memory 120 is configured of, for example, a hard disk. An OS 1202 (for example, Microsoft's Windows (registered trademark)) and a file management application 1204 (for example, Explorer in Windows (registered trademark)) which manages various kinds of file, such as print data stored in the memory 120, are installed in the memory 120. Also, an editing application 1206 (an example of an application), such as word-processing software, spreadsheet software, and presentation software, is installed in the memory 120. Furthermore, apart from a printer driver 1208 which compiles a print command or print data to be given to the complex machine 200, various kinds of driver program (not shown in FIG. 1) are installed in the memory 120.

The monitor 130 displays various kinds of information. The operating unit 140, being configured of, for example, a keyboard and a mouse, realizes a function as an input interface for inputting various kinds of command used to execute various kinds of program 1202, 1204, and 1206. The network I/F 150 brings the personal computer 100 into connection with the LAN 400, executing a transmission and reception of various data, via the LAN 400, between the personal computer 100 and an external device such as the complex machine 200.

Next, a description will be given of the complex machine 200. The complex machine 200 includes a controller 210, a memory 220, a printer 250, a monitor 270, an operating unit 280, and a network I/F 290.

The controller 210, conducting the control of its own apparatus, is configured of a CPU which executes an arithmetic processing, an ROM which stores various kinds of program, and an RAM acting as a working area. The memory 220 is configured of, for example, a hard disk or a nonvolatile memory (EEPROM), in which are stored various kinds of data, such as a program, in accordance with which to convert a print command transmitted from the personal computer 100 into print data, and the print data transmitted from the personal computer 100.

The printer 250 executes printing of the print data, into which the controller 210 has converted the print command transmitted from the personal computer 100, and of the print data transmitted from the personal computer 100. The monitor 270 displays various kinds of information. The operating unit 280, being configured of, for example, a direction key, a keyboard with which characters can be input, and an enter button, realizes a function as an input interface for inputting various kinds of command. The network I/F 290 brings the complex machine 200 into connection with the LAN 400, executing a transmission and reception of various data between the complex machine 200 and, for example, the personal computer 100.

Print Data Processing

Next, a detailed description will be given, referring to FIGS. 3 to 6, of a print data processing of the embodiment, in accordance with the print data processing flowchart shown in FIG. 2.

The print data processing of the embodiment, being a processing executed by the controller 110 of the personal computer 100, is started, for example, in a case in which a user activates the spreadsheet software of the editing application 1206 via the operating unit 140, and issues an instruction to perform a printing process on data compiled with the spreadsheet software.

Figure 3:
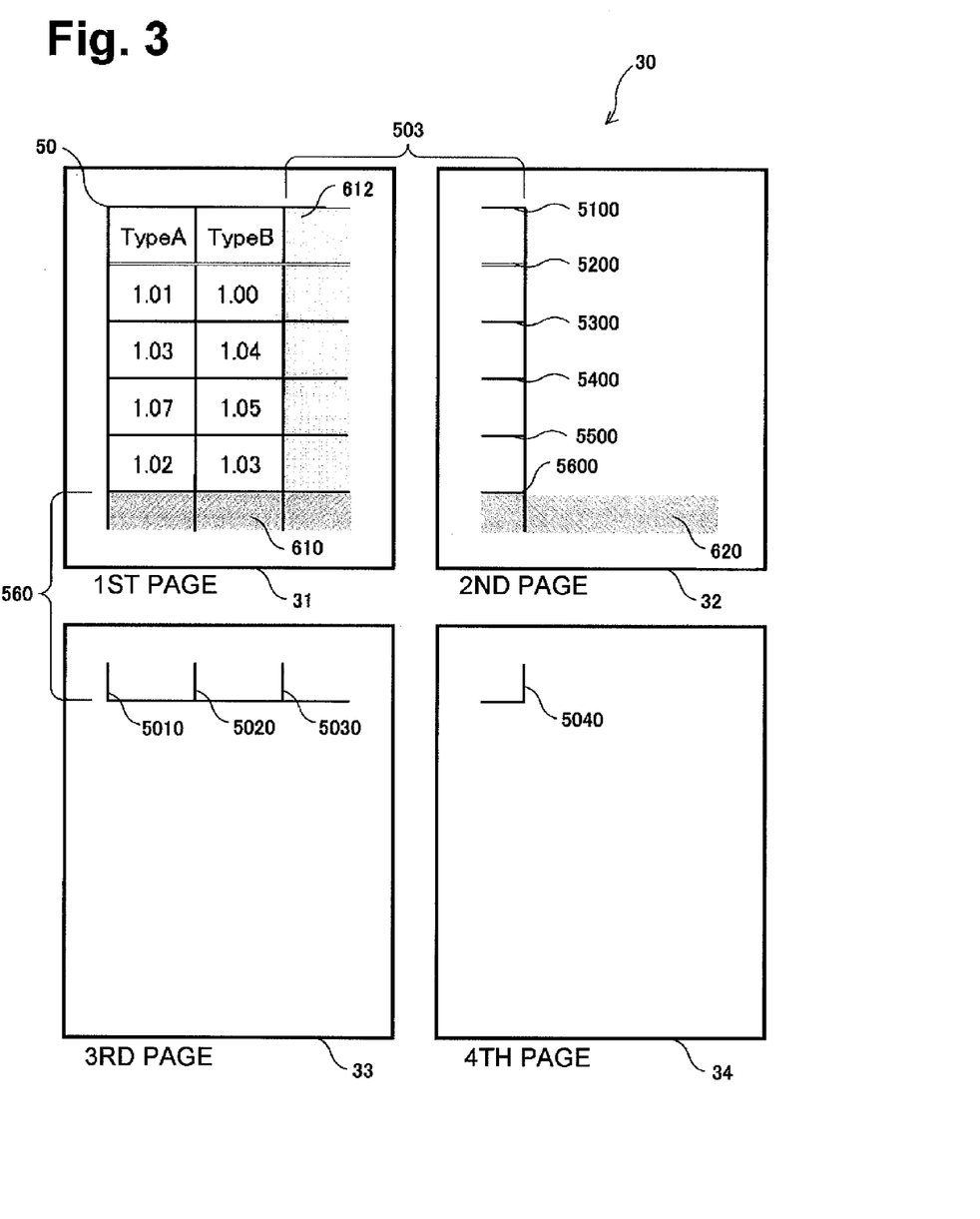
FIG. 3 is a diagram showing an example of data compiled with spreadsheet software.

FIG. 3 being a diagram showing an example of the data 30 compiled with the spreadsheet software, a specific description will be given of the print data processing of the embodiment, taking the data 30 shown in FIG. 3 as an example. The data 30 are configured of four pages from a first page 31 to a fourth page 34, and a third column 503 and sixth row 560, in a table 50 of six rows by three columns, being a blank row and blank column with no characters included therein, are divided and disposed in the pages. Specifically, the first through fifth rows of the third column 503 are divided and disposed in the first page 31 and the second page 32, and the sixth row 560 is divided and disposed in all the pages from the first page to the fourth page. Also, the first column and second column of the sixth row 560 are divided and disposed in the first page 31 and the third page 33. Herein, the characters include a hiragana character, a katakana character, a Chinese character, an alphanumeric character, and the like. The data 30 compiled with the spreadsheet software not being limited to the configuration shown in FIG. 3, it is possible to employ various forms, provided that the data are a table configured so that a blank column or blank row is divided and disposed in pages, or a table having a page in which only a blank column or blank row exists.

Figure 2:
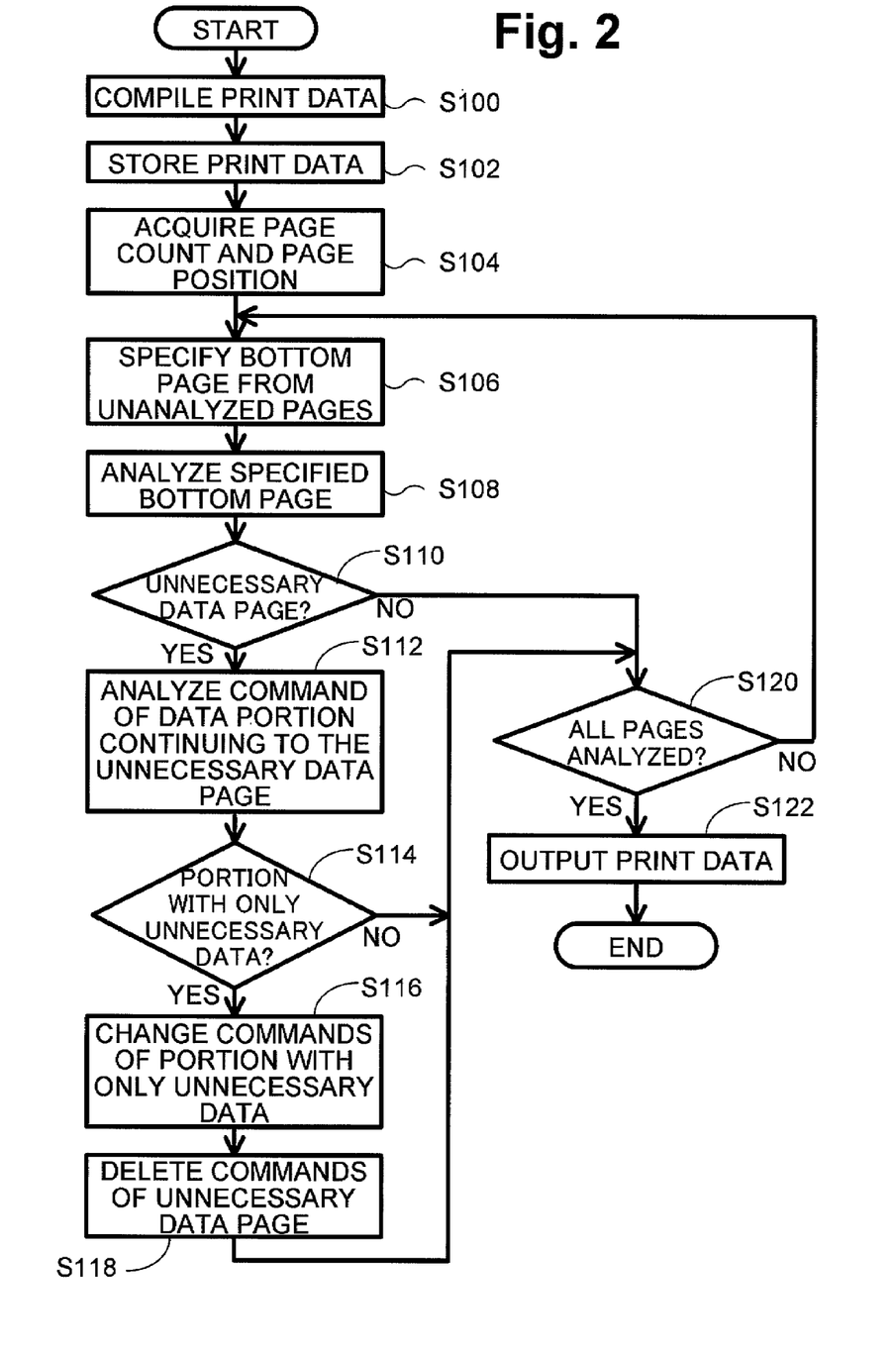
FIG. 2 is a flowchart showing a print data processing.

The controller 110 which has started the print data processing, in S100 of FIG. 2, based on the data 30 on which the user has issued the instruction to perform the printing process, carries out a page by page conversion into a print command of a type in which they can be output in the complex machine 200 (for example, a postscript type command (a PS command)), thus compiling print data 40.

Figure 4:
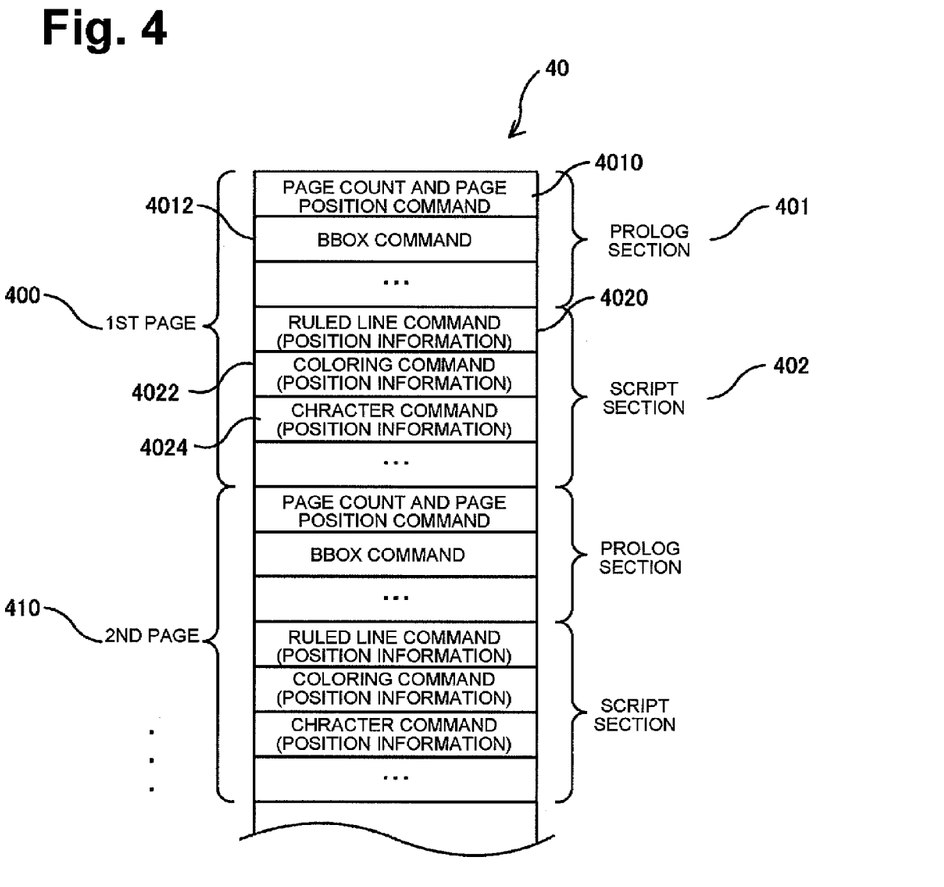
FIG. 4 is an illustration showing a configuration of commands in print data.

FIG. 4 is an illustration showing a configuration of the PS command in the print data 40. As shown in FIG. 4, the print data 40 is configured of print data of the first page 31 to the fourth page 34, compiled for each page, such as print data 400 of the first page 31, print data 410 of the second page 32, and so on. The print data 400 of the first page 31 being configured of a prolog section 401 and a script section 402, the prolog section 401 includes a page count and page position command 4010 indicating a page count and a page position, and a BBOX command 4012 indicating the area of a boundary box (BBOX) representing the range of data printed on paper. Also, the script section 402, having mainly included therein commands indicating elements configuring a table, specifically, includes a ruled line command 4020 indicating an instruction to "rule lines" and ruled line position information (starting and finishing positions of ruled lines), a coloring command 4022 indicating an instruction to "color" and colored position information, and a character command 4024 indicating characters and character position information. The page count and page position command is a command including a vertical page count (two pages in the case of data 30 in FIG. 3), and horizontal page count (two pages in the case of data 30 in FIG. 3), page numbers, and page direction information of an item of data 40. Herein, the page direction information is information indicating which direction the page numbers are allotted in order in the data 30, for example, in a manner in which the first page 31 is positioned at the upper left, the second page 32 at the upper right, the third page 33 at the lower left, and the fourth page 34 at the lower right, in the data 30 configured of a total of four pages, two pages in the vertical direction and two pages in the horizontal direction, shown in FIG. 3. Consequently, a total page count included in the print data 40 and a positional relationship of each page are determined from the vertical and horizontal page counts, page numbers, and page direction information. The print data of the second page 32 to the fourth page 34 also have the same configuration as the print data 400 of the first page 31.

In S102 of FIG. 2, the controller 110 causes the compiled print data 40 to be stored in the memory 120. Next, the controller 110 detects the page count and page position command 4010 from the prolog sections 401 in all the pages of the print data 40 stored in the memory 120, and acquires page count and page position information from this command (S104). In the embodiment, the page count is four, and position information of the first page 31 to the fourth page 34, disposed in the way shown in FIG. 3, is acquired as the page position.

Next, the controller 110 specifies bottom pages in unanalyzed pages from the acquired page count and page position information (S106), and analyzes commands of the specified bottom pages for each page (S108). The bottom pages are pages positioned at the bottom in the data 30 in which they are disposed based on the position information of each page acquired from the page count and page position command 4010. Herein, in the event that a plurality of bottom pages are specified, the plurality of pages are analyzed in order from a page, among them, positioned at the right. Consequently, in the embodiment, the third page 33 and fourth page 34 positioned at the bottom, among the first page 31 to the fourth page 34, are specified as the bottom pages and, after the print data of the fourth page 34 is analyzed, the print page of the third page 33 is analyzed.

Then, the controller 110 determines whether or not there is an unnecessary data page in the analyzed bottom pages (S110). Herein, the unnecessary data page refers to a page which includes ruled line data and does not include character data. For example, unnecessary data pages include a page in which only interrupted ruled lines exist, as in the second page 32 of FIG. 3, a page in which only a blank column or blank row including no character exists, or a page in which only a blank column or blank row, which includes no character and is colored inside its ruled lines, exists. In the embodiment, both the analyzed third page 33 and fourth page 34 are determined to be the unnecessary data pages.

If the result of the determination is that there is no unnecessary data page in the analyzed bottom pages (S110: No), the controller 110 determines whether or not all the pages in the print data 40 have been analyzed (S120). Meanwhile, if there is an unnecessary data page in the analyzed bottom pages (S110: Yes), the controller 110 analyzes commands of a data portion continuing to the detected unnecessary data page, in a page other than the unnecessary data page detected in S110 (S112), in the print data 40. Herein, in the event that a plurality of unnecessary data pages are detected from among the pages specified in S106, the unnecessary data pages, among the plurality of pages, are subjected to the process of S112 in an order from a position of the far right. Then, a data portion continuing to an unnecessary data page subjected to the process is analyzed in a page, among pages adjacent to the page subjected to the process, excluding an unnecessary data page which is currently not subjected to the process. Also, the data portion continuing to the unnecessary data page refers to a print area which exists from the end of an interrupted ruled line to the position of a ruled line, among ruled lines intersecting an adjacent page ruled line continuing to the interrupted ruled line of an unnecessary data page, which is closest to the end. Specifically, in the embodiment, of the third page 33 and fourth page 34 detected as the unnecessary data pages, firstly, the fourth page 34 is subjected to the process of S112. Then, in the print data 410 of the second page 32, of the second page 32 and third page 33 which are pages adjacent to the fourth page 34, excluding the third page 33 which is the detected unnecessary data page, commands of a print area 620 (the shaded portions in FIGS. 3 and 5A), which exists in a range from a horizontal ruled line 5600 intersecting a vertical ruled line 5040 continuing to the fourth page 34 to the end of the interrupted ruled line 5040, are analyzed. Next, shifting the processing subject to the third page 33, in the print data 400 of the first page 31, of the first page 31 and fourth page 34 which are pages adjacent to the third page 33, excluding the fourth page 34 which is the detected unnecessary data page, commands of a print area 610 (the shaped portions in FIGS. 3 and 5A), which exists in a range from the horizontal ruled line 5600 intersecting vertical ruled lines 5010, 5020, and 5030 continuing to the third page 33 to the end of the interrupted ruled line 5040, are analyzed.

Next, the controller 110 determines whether or not the analyzed data portion is formed only of unnecessary data (S114). Herein, the unnecessary data refer to ruled line data and coloring data continuing to the interrupted ruled line of the unnecessary data page. That is, in the event that the character command 4024 is not included in the analyzed data portion, it is determined that the data portion is formed only of the unnecessary data. In the embodiment, as the analyzed data portions 610 and 620 (the shaded portions in FIGS. 3 and 5A) are formed only of the ruled line data continuing to the interrupted ruled lines 5010, 5020, 5030, and 5040 of the unnecessary data pages, and do not include the character data, they are determined to be the unnecessary data portions. Incidentally, when determining whether a data portion is formed only of unnecessary data or not, it is necessary to determine whether the data portion includes ruled line data and does not include character data, without the necessity to determine whether it includes coloring data. This is because that the coloring data indicates whether the inside of the ruled lines is colored. In other words, if the data portion includes ruled line data and does not include character data, no matter whether the data portion includes coloring data or not, the data portion may be determined as being formed only of unnecessary data. In the event that no unnecessary data portion is detected from the analyzed data portions as a result of the determination (S114: No), the controller 110 determines whether or not all the pages of the print data 40 have been analyzed (S120). Meanwhile, in the event that an unnecessary data portion formed only of the unnecessary data is detected from the analyzed data portions (S114: Yes), the controller 110 changes print data (commands) 40 of a page including the detected data portion (S116).

Figure 5A:
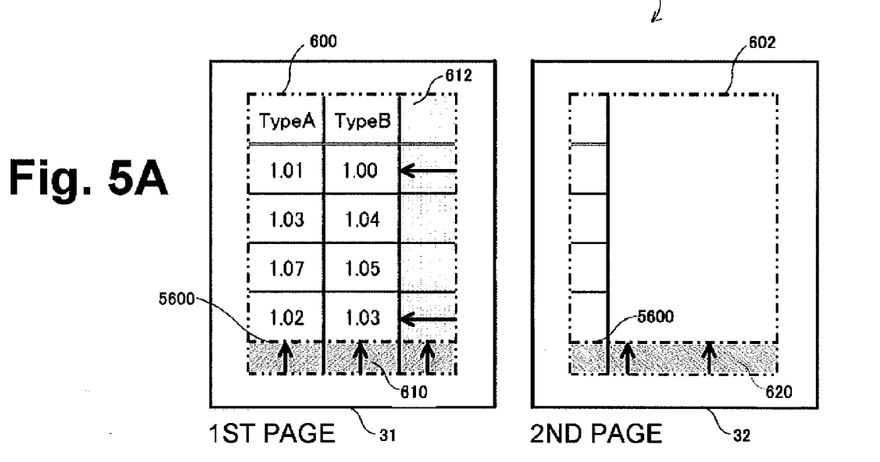
FIG. 5A is a diagram showing a print data processing.
Figure 5B:
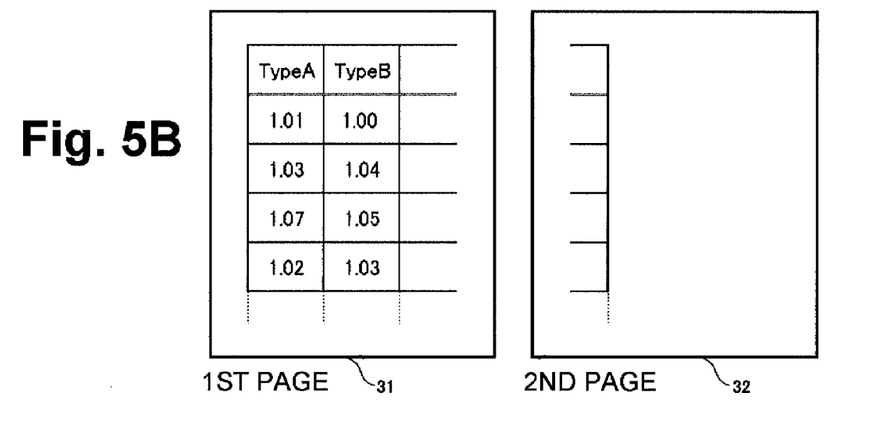
FIG. 5B is a diagram showing a result after the print data processing.

In S116, the controller 110 carries out an operation of narrowing the areas of boundary boxes 600 and 602 shown by the two-dot chain line to the position of the ruled line 5600 which, intersecting the interrupted ruled lines, is closest to the ends of the interrupted ruled lines, in such a way as not to include the unnecessary data portions 610 and 620 detected in S114, as shown in FIG. 5A. Specifically, the controller 110 carries out a process of changing the BBOX command 4012 of the print data 400 and 410 of the first page 31 and second page 32 to a command to set the position of the ruled line 5600 at the bottom. As the unnecessary data portions are excluded from the print area by means of the process, it is possible to prevent unnecessary data (the dotted lines in FIG. 5B), such as ruled lines interrupted as shown in FIG. 5B, from being output.

Next, in S118 of FIG. 2, the controller 110 deletes the print data (commands) 40 of the unnecessary data pages continuing to the unnecessary data portions detected in S114. In the embodiment, the print data of the third page 33 continuing to the unnecessary data portion 610 of the first page 31, and of the fourth page 34 continuing to the unnecessary data portion of the second page 32, are deleted. Then, the controller 110 determines whether or not all the pages of the print data 40 have been analyzed (S120). In the above operation to the first page 31 that is adjacent to unnecessary pages (such as the second page 32 or the third page 33), the following operations are performed: a portion of ruled lines (5100, 5200, 5300, 5400, 5500, 5600, 5010, 5020, 5030) of the first page 31 continuing to the ruled lines of the unnecessary pages, i.e. the second page 32 and the third page 33, is deleted. In particular, from the position where the ruled lines of the first page 31 continuing to the corresponding ruled lines (5100, 5200, 5300, 5400, 5500, 5600, 5010, 5020, 5030) of the second page 32 and the third page 33 up to an intersecting position where the ruled lines intersect another ruled lines in the first page 32, these ruled lines are deleted. Take the ruled line 5100 as an example. See FIG. 3, the ruled line 5100 exists both in the second page 32 which only includes unnecessary data and in the first page 31 that is adjacent to the second page 32. When the print data of the unnecessary page 32 is deleted, a portion of the ruled line 5100 of the first page 31 that is adjacent to the unnecessary page 32 is deleted. In particular, from the boundary between the first page 31 and the second page 32 (i.e. the position where the ruled line 5100 in the first page 31 continues to the ruled line 5100 in the unnecessary page 32) to an intersecting position where the ruled line 5100 intersects another ruled line 5030, the part of the ruled line 5100 is deleted. Similar operations are performed on the ruled lines 5200, 5300, 5400, 5500 and 5600. Moreover, the ruled line 5020 exists both in the third page 33 which only includes unnecessary data and in the first page 31 that is adjacent to the third page 33. When the print data of the unnecessary page 33 is deleted, a portion of the ruled line 5020 of the first page 31 that is adjacent to the unnecessary page 33 is deleted. In particular, from the boundary between the first page 31 and the third page 33 (i.e. the position where the ruled line 5020 in the first page 31 continues to the ruled line 5020 in the unnecessary page 33) to an intersecting position where the ruled line 5020 intersects another ruled line 5600, the part of the ruled line 5020 is deleted. Similar operations are performed on the ruled lines 5010 and 5030.

If it is determined that all the pages of the print data 40 have been analyzed (S120: Yes), the controller 110 transmits the print data 40 to the complex machine 200 (S122), finishing the print data processing.

Meanwhile, if it is determined that there is an unanalyzed page in the print data 40 (S120: No), the process is returned to S106 of FIG. 2, and the controller 110 repeats the processes of S106 to S120 until all the pages of the print data 40 are analyzed. In the embodiment, as it is only the third page 33 and fourth page 34 which have been analyzed in entirety as the bottom pages by the processes up to S118, it is determined in S120 that there is an unanalyzed page, and the process is returned to S106.

Then, in S106 of FIG. 2, the controller 110 specifies the first page 31 and second page 32 as the bottom pages and, after analyzing the print data 410 of the second page 32 positioned at the right, analyzes the print data 400 of the first page 31 (S108). Then, the controller 110 determines the analyzed second page 32 to be an unnecessary data page (S110: Yes) and, in the print data 400 of the first page 31 adjacent to the second page 32, analyzes commands of a print area 612 (the shade portions in FIGS. 3 and 5A) which exists in a range from ends of the horizontal ruled lines 5100, 5200, 5300, 5400, and 5500, at which their continuity to the second page 32 is interrupted, to the vertical ruled line 5030 (S112).

Next, as the analyzed data portion 612 is formed only of the ruled line data continuing to the interrupted ruled lines of the unnecessary data page, the controller 110 determines the data portion 612 to be an unnecessary data portion (S114: Yes), and carries out an operation of narrowing the area of the boundary box 600 (refer to FIG. 5A) to the position of the ruled line 5030 which, intersecting the interrupted ruled lines 5100, 5200, 5300, 5400, and 5500, is closest to the ends of the interrupted ruled lines. Specifically, the controller 110 carries out a process of changing the BBOX command 4012 included in the print data 400 of the first page 31 to a command to set the position of the ruled line 5030 at the far right (S116).

Figure 6:
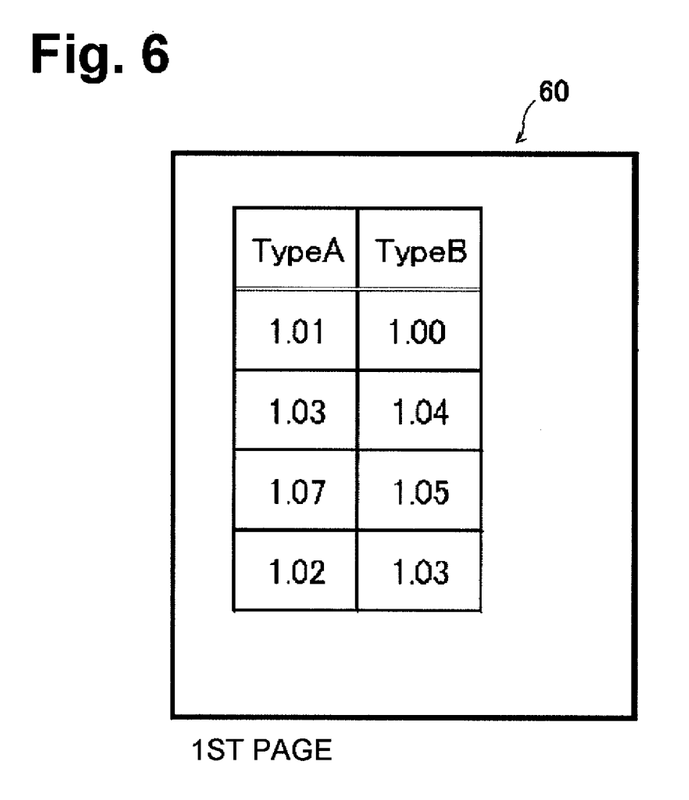
FIG. 6 is a diagram showing a print result according to the print data processing.

Then, in S118 of FIG. 2, the controller 110 deletes the print data 410 of the second page 32 continuing to the unnecessary data portion 612 of the first page 31. The controller 110, as it has analyzed all the pages of the print data 40 (S120: Yes), transmits the print data 40 to the complex machine 200 (S122). Subsequently, a print result 60 shown in FIG. 6 is obtained in the complex machine 200.

As heretofore described, by narrowing the ranges of the boundary boxes 600 and 602 in such a way as to exclude the unnecessary data portions 610, 612, and 620 from the pages including the unnecessary data portions 610, 612, and 620, it is possible, after deleting the unnecessary data pages, to obtain the print result 60 which will not lead a user to misunderstanding that there may be a continuity of data.

Also, it is possible, by a simple operation of changing the BBOX command 4012 included in the print data of each page, to obtain the user's desired print result 60 without any interrupted ruled line or the like.

Also, as the print data 40 includes the page count and page position command 410 including the vertical page count, horizontal page count, page numbers, and page direction information of one item of print data 40, it is possible to easily specify the total page count included in the print data 40 and the positional relationship of each page.

Furthermore, by compiling the print data 40 by, based on the data 30 instructed by the user to be subjected to the printing process, carrying out a page by page conversion into a command of a type in which they can be output in the complex machine 200, it is possible to easily carry out a processing of an unnecessary data page, and of an unnecessary data portion of a page adjacent thereto.

Heretofore, a description has been given of one embodiment of the invention but, the invention not being limited to the heretofore described embodiment, it is possible to employ various forms without departing from the scope of the invention.

In the embodiment, an analysis, and a detection of an unnecessary data page, are carried out from a page of the print data 40 positioned at the bottom, but an analysis, and a detection of an unnecessary data page, may also be carried out from a page positioned at the far right. An analysis, and a detection of an unnecessary data page, may also be carried out from, for example, a last page.

Also, in the embodiment, the print data processing is carried out with the personal computer 100, but printing on a printing medium may also be carried out, instead of S122, by the complex machine 200 acquiring the print data 40 compiled with the personal computer 100, and the processes of S102 to S120 being carried out in the complex machine 200.

Also, a configuration may also be such that the result (refer to FIG. 6) of the print data 40 being analyzed and processed is displayed on the monitor 130 or 270 of the personal computer 100 or complex machine 200 before being output from the complex machine 200, thus making the user aware of it.

Furthermore, it is also possible for the user to set in advance whether or not to carry out a print data processing, and store setting information.

In the heretofore described embodiment, a configuration is such as to delete a portion of a ruled line in order to process an adjacent page, but processing details are not limited to this. In order to make the portion of the ruled line inconspicuous, a configuration may also be such as to reduce the thickness of the ruled line, change the color of the ruled line, make the ruled line into a broken line, shorten the length of the ruled line, or the like.

Also, in the heretofore described embodiment, print data with commands included therein are processed, but image data formed of dots may also be processed as the print data, In this case, for example, a configuration may also be such as to delete a plurality of dots continued a predetermined length or more in the vertical direction or horizontal direction and, in the event that no remaining dot exists in a page, detect the page as an unnecessary page.

What is claimed is:

1. A print data processing apparatus comprising:
a memory which stores print data configured page by page;
an unnecessary page detection portion configured to detect an unnecessary page which includes ruled line data and does not include character data from the print data stored in the memory;

an unnecessary page deletion portion configured to delete, from the print data stored in the memory, the unnecessary page detected by the unnecessary page detection portion, wherein the print data include a ruled line command indicating that a ruled line is included, and a character command indicating that a character is included, and the unnecessary page detection portion is configured to detect the unnecessary page including the ruled line command and not including the character command by analyzing commands in the print data to determine whether a page includes the ruled line command and whether the page includes the character command; and an adjacent page processing portion configured to process ruled line data included in print data of a page adjacent to the unnecessary page, and to store the processed print data of the page adjacent to the unnecessary page in the memory, wherein the adjacent page processing portion is configured to delete a portion of a ruled line continuing to a ruled line of the unnecessary page.

2. The print data processing apparatus according to claim 1, wherein the adjacent page processing portion deletes the ruled line continuing to the ruled line of the unnecessary page up to an intersecting position where the ruled line continuing to the ruled line of the unnecessary page intersects another ruled line.

3. The print data processing apparatus according to claim 1, wherein the print data being compiled and divided into a plurality of pages in a first order downward from a top of a table, and the unnecessary page detection portion detects the unnecessary page in a second order from a page corresponding to a bottom of the table.

4. A print data processing method for a print data processing apparatus comprising a memory which stores print data configured page by page, comprising:

an unnecessary page detection step of detecting an unnecessary page including ruled line data and not including character data from the print data stored in the memory;

an unnecessary page deletion step of deleting, from the print data stored in the memory, the unnecessary page detected in the unnecessary page detection step, wherein the print data include a ruled line command indicating that a ruled line is included, and a character command indicating that a character is included, and the unnecessary page detection step comprises a step of detecting the unnecessary page including the ruled line command and not including the character command by analyzing commands in the print data to determine whether a page includes the ruled line command and whether the page includes the character command; and an adjacent page processing step of processing ruled line data included in print data of a page adjacent to the unnecessary page, and of storing the processed print data of the page adjacent to the unnecessary page in the memory, wherein the adjacent page processing step comprises a step of deleting a portion of a ruled line continuing to a ruled line of the unnecessary page.

5. The print data processing method according to claim 4, wherein the adjacent page processing step comprises a step of deleting the ruled line continuing to the ruled line of the unnecessary page up to an intersecting position where the ruled line continuing to the ruled line of the unnecessary page intersects another ruled line.

6. The print data processing method according to claim 4, wherein the print data has been compiled and divided into a plurality of pages in a first order downward from a top of a table, and the unnecessary page detection step comprises a step of detecting the unnecessary page in a second order from a page corresponding to a bottom of the table.

* * * * *